United States Patent [19]
Shields

[11] 3,825,767
[45] July 23, 1974

[54] RECTIFIER ASSEMBLY

[75] Inventor: Marvin L. Shields, Bloomington, Ind.

[73] Assignee: Sarkes Tarzian Inc., Bloomington, Ind.

[22] Filed: Aug. 22, 1973

[21] Appl. No.: 390,337

[52] U.S. Cl.......... 307/100, 174/DIG. 5, 174/52 PE
[51] Int. Cl. ............................................. H02b 1/00
[58] Field of Search .......... 174/DIG. 5, 15 R, 16 R, 174/52 PE; 317/100, 234 A, 234 W; 321/8

[56] References Cited
UNITED STATES PATENTS
3,573,567  4/1971  Harris ..................... 174/DIG. 5 X
3,638,073  1/1972  Bernstein ........................ 321/8 R OTHER PUBLICATIONS
IBM Technical Disclosure Bulletin, "Diode Mounting Device," Vol. 11, No. 7, December 1968, p. 771

Primary Examiner—William M. Shoop, Jr.

[57] ABSTRACT

A rectifier assembly comprising a base formed of heat conductive material and having a flat, annular mounting face encircling an integral upstanding centrally positioned mounting post, a layer of electrically insulating material on said mounting face; a rectifier assembly comprising one or more heat producing rectifier elements mounted on said base in symmetrical array around said mounting post including conductive terminal means for at least some of said elements including flat strip portions in direct heat conductive contact against said layer of insulating material and means mounted on said post for uniformly and continuously forcing each of said strip portions against said layer of insulating material for transmission of heat developed in said rectifier elements to said heat sink base.

14 Claims, 5 Drawing Figures

PATENTED JUL 23 1974         3,825,767

RECTIFIER ASSEMBLY

The present invention relates to a new and improved rectifier assembly and more broadly relates to electrical devices which generate substantial quantities of heat which must be carried away and dissipated. In rectifier assemblies and other devices of the character described which generate substantial quantities of heat during operation, difficulty has been encountered in carrying away and dissipating the heat at a sufficient rate that relatively small, inexpensive rectifier units may be employed to provide a desired current rating for the assembly. Furthermore, in bridge type rectifier arrangements wherein a plurality of rectifiers are simultaneously generating heat the heat transfer problem is even more acute because the bridge rectifier network with terminals assembled must be tested before it is installed in its housing. Consequently, when the tested network is placed in the housing and encapsulated only one or two points of the assembly may make intimate heat transferring contact with the housing so that relatively large, expensive rectifiers have to be employed to achieve a given current rating.

The present invention relates to a new and improved electrical device of the character described and it is an object of the present invention to provide a new and improved rectifier assembly having an increased capability of dissipating heat generated therein which may be economically manufactured and will provide high current rating with relatively small rectifier units.

Another object of the present invention is to provide a new and improved electrical device of the character described having a new and improved means for insuring that rapid and effective heat transfer from all of the heat generating elements of a multi-unit assembly takes place to prevent overheating of the same.

Yet another object of the invention is to provide a new and improved electrical device of the character described wherein novel assembly techniques may be employed resulting in minimum manufacturing and assembly costs for units which have improved current rating in comparison with more costly prior art units.

Yet another object of the invention is to provide a new and improved electrical device having novel means for securing the heat generating elements thereof with a heat sink or the like so that excellent heat transfer is obtained while at the same time suitable insulation is achieved between the elements and the heat sink.

For a better understanding of the present invention reference should be had to the following detailed description taken in conjunction with the claims and drawings, in which:

Briefly, the foregoing and other objects and advantages of the present invention are accomplished in an illustrated embodiment thereof comprising a rectifier assembly having a base formed of heat conductive material comprising a heat sink with a recess defined on one side opposite a mounting face. The recess is provided with a flat annular bottom wall surface and a peripheral sidewall defined around an integral, upstanding centrally positioned mounting post. A layer of heat conductive, electrically insulating material of the liquid or varnish type is applied over the bottom wall of the recess and extends upwardly over a portion of the outer peripheral wall surface and the outer surface of the central mounting post. This material is applied in liquid form and then is centrifugally spread over the surfaces to be covered by rotational spinning of the heat sink.

The rectifier assembly is seated in the recess and comprises one or more heat generating diode elements mounted in symmetry around the mounting post and including conductive terminal means having at least a portion including a flat strip arranged for heat conductive contact with said layer of insulating material. Thrust means such as a jam nut is assembled on the mounting post for uniformly forcing all of the flat conductive strip portions of the assembly firmly against said heat conductive, electrically insulating layer thus providing excellent heat transfer into the heat sink. After assembly, the recess is then filled with an insulating material around the diode elements and terminals as the jam nut continues to hold the flat strip terminal portions against the heat conductive insulating layer.

Figure 1:
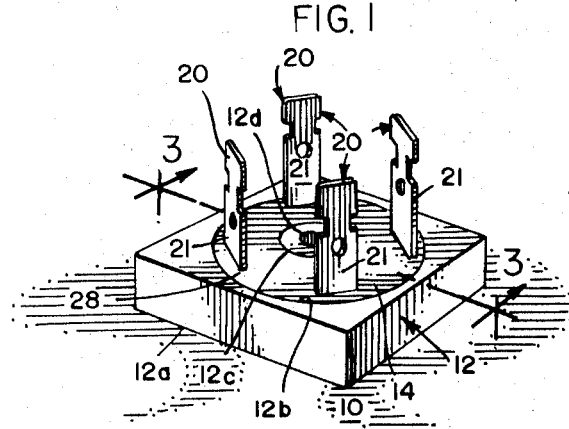
FIG. 1 illustrates a top, perspective view of a new and improved electrical device constructed in accordance with the features of the present invention.

Referring now more particularly to the drawings, in FIG. 1 is illustrated an assembled rectifier assembly constructed in accordance with the features of the present invention and referred to generally by the reference numeral 10. The rectifier assembly 10 includes a rectangular heat sink or base 12 constructed of aluminum, magnesium or other metal or material having a high coefficient of heat conductivity or specific heat capacity. The heat sink is adapted to be mounted on a larger heat radiator if required or on a metal chassis or the like for further dispersion and dissipation of the heat generated in the rectifier assembly. The metallic heat sink 12 is formed with a planar, flat surface 12a (FIG. 3) on one side adapted to be secured in good heat conductive contact to a component chassis or heat radiator element and is formed with a cylindrical, annular cup-like recess or receptacle 14 having an outer sidewall 12b and best shown in FIG. 2. The annular recess encircles an integral, centrally positioned tubular mounting post 12c having a central axial bore 12d for accommodating a bolt or the like used for securing the rectifier assembly in place. The outer side faces of the heat sink 12 may form a square or rectangular shape and are generally planar. It is to be understood that the heat sink may also be generally cylindrical in shape and is dimensioned to provide an appropriate volume of metal required for the storage, dissipation and transit for a desired flow rate of heat delivered thereto.

The cylindrical recess or receptacle 14 is formed with a flat, planar annular bottom wall 12e which is parallel with and spaced relatively close to the underside or heat sink mounting surface 12a in order to facilitate rapid heat transfer through the bottom wall. The cylindrical outer sidewall 12b, the annular bottom wall 12e, and a cylindrical outer surface 12f of the mounting post 12c form the walls of the cup shaped receptacle 14 adapted for receiving and securing the electrical components of the rectifier assembly. The heat sink 12 may be formed in a precision die casting process or an injection molding process so that relatively true planar surfaces are provided. Additional surface finishing or machining may be provided for the mounting surface 12a and the bottom wall 12e of the recess 14 to insure good heat transfer with a minimum of surface barrier resistance caused by roughness or unevenness.

Figure 3:
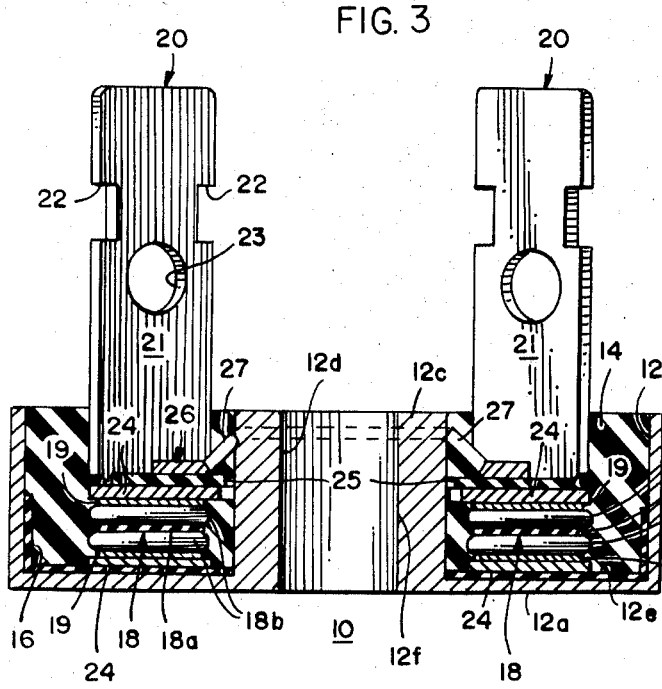
FIG. 3 is an enlarged fragmentary sectional view taken substantially along lines 3—3 of FIG. 1.

In accordance with the present invention, a thin layer of heat conductive, electrically insulating material indicated by the reference numeral 16 is provided on the surfaces of the recess or receptacle 14. The layer 16 is initially in liquid form comprising a high quality insulating varnish like that sold under the trademark "Deltabond." After the appropriate volume or number of droplets of liquid insulating varnish are deposited in the receptacle 14, the heat sink 12 is rotated or spun about the vertical axis through the bore 12e of the central mounting post 12c. When the heat sink 12 is rotated, the varnish type liquid insulation 16 spreads in a thin layer over the bottom wall 12e and moves up a distance over the outer peripheral surface 12b of the recess 14. After the bottom is fully covered with varnish the remaining excess climbs up the sidewall 12b during the centrifugal spinning action. Insulating varnish is also present on a lower portion of the outer surface 12f of the central mounting post 12c. After spreading of the liquid insulating varnish in the manner aforesaid, the varnish layer is cured and hardened into a tough, thin heat conductive, electrically insulating layer 16 as best shown in FIG. 3. The thin layer is flat and even on its upper surface for heat conductive, electrically insulating contact with the electrical subassembly of the rectifier assembly 10, so that heat which is developed in the electrical subassembly seated in the recess is efficiently transmitted to the upper surface of the varnish layer and flows through the layer and is transferred efficiently into the material of the heat sink 12 with very little resistance to heat flow or barrier delay because of surface irregularities.

In accordance with the present invention the rectifier assembly 10 includes a subassembly comprising a plurality of heat generating, diode or rectifier elements referred to by the reference numeral 18 and seated within the receptacle 14 in symmetrical arrangement around the outer axis of the mounting post 12d. As shown best in FIG. 3 each of the individual rectifiers or diodes 18 may comprise a central layer or element 18a flanked on one or both opposite faces with a disc like layer or element 18b which elements in turn are disposed between a pair of conductive metal washer-like discs 19. Four diodes 18 may be provided for a full wave bridge rectifier as shown and the assembly thus includes four conductive terminal members referred to by the numeral 20. Each terminal includes an upstanding, vertical leg 21 having notches 22 along opposite edges thereof and a hole 23 for receiving electrical leads, connectors etc. to be soldered or otherwise connected thereto. The upstanding legs 21 of the terminals are provided with a pair of horizontal, angularly divergent flat strip members or feet 24 at the lower end and each foot is adapted to electrically contact an upper or lower conductive metal disc 19 of an associated diode or rectifier 18. At least one pair diammetrically oppositely positioned terminal elements 20 is positioned with the feet 24 in direct heat conductive contact with the upper surface of the insulating layer 16 on the recess bottom, while the other pair of terminal elements 20 have their feet 24 in contact with the upper conductive disc 19 of the rectifiers 18.

Figure 2:
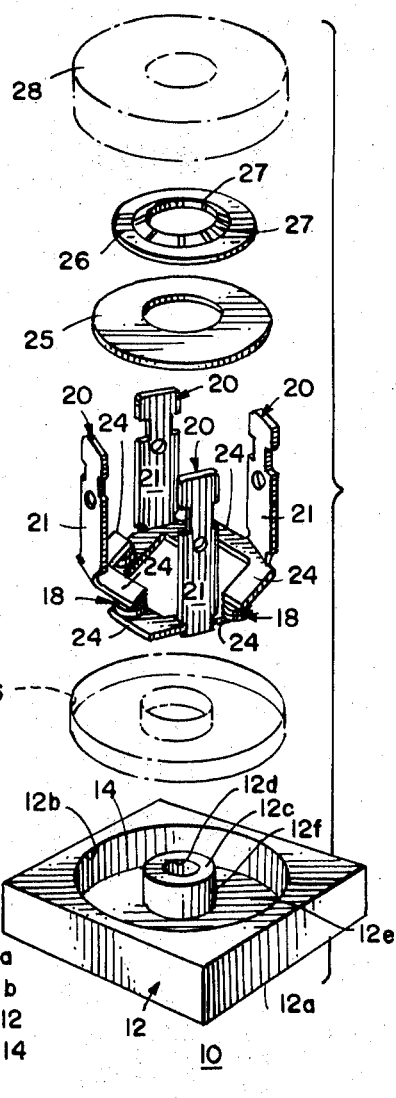
FIG. 2 is an exploded perspective view of the electrical device of FIG. 1 showing the individual components and subassemblies thereof.

Before the electrical subassembly is positioned in the receptacle or recess 14 of the heat sink 12, pairs of terminal elements 20 and the associated diodes or rectifiers 18 are interconnected together as shown in FIG. 2 in a complete self-supporting subassembly. The feet 24 of the terminal elements 20 are soldered or otherwise connected to the metal discs 19 on opposite sides of the rectifier elements 18 and these connections are heat conductive as well as electrically conductive. The rectifier elements 18 are disposed diammetrically on opposite sides of the central mounting post 12c of the heat sink 12 and accordingly the legs 21 of conductive terminal elements 20 connected to the rectifiers are disposed in symmetrical array with respect to the central axis of the mounting post.

If the subassembly were simply dropped into the receptacle 14 and encapsulated, as in prior art arrangements, only two or three points on the bottom of the assembly would be in good heat conducting relation to the layer 16. However, in accordance with an important feature of the invention and in order to establish an effective means for conducting heat in a flow path away from the heat generating diode elements 18 of the rectifier subassembly, the underside of the feet 24 on the lowermost pairs of terminal elements 20 are uniformly and continuously biased into high pressure contact against the upper surface of the insulating layer 16. More particularly, an annular insulating washer 25 formed of dielectric material is concentrically aligned on the mounting post 12c after the electrical subassembly has been inserted in the receptacle 14 and a jam nut 26 is inserted onto the mounting post 12c and is forced downwardly thereon to bias and pressure the elements of the electrical subassembly uniformly downwardly against the thin heat conductive insulating layer 16. The jam nut is staked onto the mounting post 12c and includes a plurality of inwardly extending radial dogs or teeth 27 which dig into the outer surface 12f of the mounting post and permanently bias the subassembly downwardly so that the lower contact strips of feet 24 of the terminal elements 20 are all continuously maintained in pressure contact against the heat conductive, electrically insulating layer 16. After the jam nut is staked in place on the mounting post the receptacle or recess 14 is filled with a potting compound comprising electrically insulating material 28 in liquid form which is then hardened or cured to firmly secure the upstanding legs 21 of the terminal elements 20 in place and provide electrical insulation and physical support for the components of the electrical subassembly mounted in the receptacle 14 of the heat sink 12. The insulation material 28 is a good heat conductor and a good electrical insulator so that heat is conducted away from the heat generating elements 18 of the rectifier assembly into the heat sink 12 in a rapid and efficient manner. The primary area of heat transfer from the electrical subassembly to the heat sink is directly between the feet 24 below the rectifier elements 18 via the heat conductive insulation layer 16 into the bottom wall of the heat sink 12. The symmetrical arrangement of the heat generating electrical elements 18 around the center mounting post 12c of the heat sink and the positive and continuous contact pressure applied by the centrally positioned jam nut 26 insures excellent heat transfer.

Other types of heat generating elements such as transistors and integrated circuit assemblies and the like may be utilized in accordance with the present invention and these may also be arrayed in a symmetrical arrangement around the central mounting post 12c with the terminal elements therefor biased into pressure contact against the heat insulating layer 16 by a central thrust member 26 so that good heat transfer to the heat sink 12 is achieved.

Figure 4:
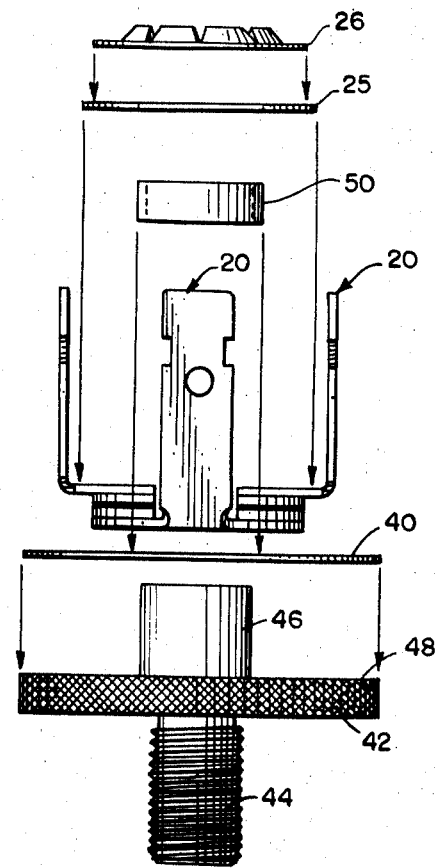
FIG. 4 is an exploded perspective view of an alternative embodiment of the invention showing the individual components and subassemblies thereof but without an encapsulating enclosure.
Figure 5:
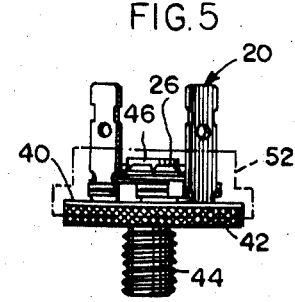
FIG. 5 is a side view of the device of FIG. 4 in final assembled condition.

In FIGS. 4 and 5 of the drawings, an alternative embodiment of the invention is disclosed, wherein a thin sheet of insulating material 40 is used in place of the insulating varnish layer 16 of the embodiment of FIGS. 1 to 3, inclusive. In certain respects the embodiment of FIGS. 4 and 5 is similar to that of FIGS. 1 to 3 and the same reference numbers have been applied to components which have substantially the same function in the two embodiments.

In the embodiment of FIGS. 4 and 5 a base member 42, preferably of aluminum, is provided with a threaded mounting portion 44 and an upstanding mounting post 46. The thin insulating disc 40, which preferably is made of a polyester film such as Mylar and has a thickness of 0.003 inch for good heat transfer, is positioned on the annular upper mounting face 48 of the base member 42. An insulating sleeve 50 of suitable insulating material is placed over the central mounting post 46 after which the rectifier subassembly is placed on the Mylar disc 40. The insulating washer 25 is then inserted over the post 46 and the jam nut 26 is assembled on the post 46 so that it exerts a continuous and uniform pressure on all of the rectifier units of the subassembly and forces all of these units into high pressure contact with the upper surface of the insulating disc 40 and also presses the disc 40 firmly against the surface 48. As a result, good heat transfer is achieved between the heat generating rectifier units and the heat sink provided by the base 42.

After the elements have been assembled in the manner discussed above, the unit is placed in a suitable mold and an epoxy body, illustrated in dotted lines in FIG. 5 as the body 52 is poured around the components of the rectifier assembly so as to provide an encapsulating enclosure for these units comparable to the enclosure provided in the embodiment of FIGS. 1 to 3 by the combined housing 12 and potting compound 28.

The embodiment of FIGS. 4 and 5 is simpler to fabricate and if the disc 40 is of the thickness indicated it provides adequate heat transfer between the rectifier units and the base 42 while providing better insulating qualities than the Deltabond varnish layer 16 described above in connection with the embodiment of FIGS. 1 to 3, inclusive. On the other hand, the layer 16 in the embodiment of FIGS. 1 to 3, inclusive, has somewhat better heat conducting characteristics than the Mylar disc 40 in the embodiment of FIGS. 4 and 5. In both embodiments the jam nut functions to maintain uniform and continuous pressure on all rectifier units so as to insure good heat transfer characteristics for the entire assembly.

Although the present invention has been described with reference to certain illustrative embodiments thereof, it should be understood that numerous other modifications and embodiments can be devised by those skilled in the art that will fall within the spirit and scope of the principles of this invention.

What is claimed as new and desired to be secured by Letters Patent of the United States is:

1. An electrical device comprising a base formed of heat conductive material and having an annular mounting face and an integral upstanding mounting post centrally disposed in said face, a layer of electrically insulating material on said mounting face, an electrical subassembly comprising one or more heat generating elements mounted on said base in symmetrical array around said mounting post, conductive terminal means for at least one of said elements including a flat strip positioned in heat conductive contact against said layer of insulating material, and means mounted on said post for urging said flat strip toward said layer of insulating material.

2. The device of claim 1 wherein said layer of insulating material comprises a layer of insulating varnish applied to said recess bottom wall in liquid form and spread over said bottom wall surface by centrifugal force, said varnish being cured into solid form subsequent to said spreading.

3. The device of claim 1, wherein said layer of insulating material comprises a sheet of polyester resin which is thin enough to provide good heat transfer between said base and said flat strip.

4. The device of claim 1 wherein said conductive terminal means comprises one or more elements having an upstanding leg projecting away from said base for external connection thereto, said flat strip integrally joining a lower end of said leg and disposed in electrical contact on an upper surface of said strip with a lower end of a heat generating element.

5. The device of claim 4 wherein said conductive terminal element includes a pair of said flat strips angularly divergent and spaced outwardly of said mounting post.

6. The device of claim 4 wherein said terminal means including a pair of said elements with legs disposed on diametrically opposite sides of said mounting post and a second pair of terminal elements, each having an upstanding leg and a pair of integral flat strips joined to the lower end of said legs in contact with the upper end of a heat generating element.

7. The device of claim 6 wherein said legs of said second pair of terminal elements are disposed on diametrically opposite sides of said mounting post between the legs of said first mentioned pair of terminal elements.

8. The device of claim 7 wherein said means for urging said flat strip toward said layer of insulating material comprises annular means engaging said strips of said second pair of terminal elements.

9. The device of claim 8 wherein said annular means comprises an insulating washer and annular thrust means engaging said mounting post and biasing said insulating washer toward said mounting face.

10. The device of claim 9 wherein said annular thrust means comprises a jam nut including deflectable teeth angularly engaging said mounting post.

11. A rectifier assembly comprising a heat sink defining a recess with a bottom wall, an integral mounting post centrally disposed in said recess, a layer of electrical insulation on said bottom wall, two pairs of rectifiers mounted in said recess and disposed on diammetrically opposite sides of said mounting post, a first pair of terminal elements, each element including an upstanding leg parallel of said mounting post and a pair of integral feet comprising flat strips normal to the lower end of said leg, said strips in contact against said insulating layer and the lower end of said rectifiers, a second pair of terminal elements, each element including an upstanding leg parallel of said mounting post and a pair of integral feet comprising flat strips in contact against the upper end of said rectifiers, and thrust means engaging said mounting post biasing said feet of said second pair of terminal elements toward said recess bottom wall to provide good heat conductive contact between said feet of said first pair of terminal elements and said layer of insulating material.

12. The rectifier assembly of claim 11 wherein said thrust means comprises an insulating washer on said mounting post in contact against said feet of said second pair of terminal elements and an annular thrust member engaging said washer and said mounting post biasing said washer toward said recess bottom wall.

13. The rectifier of claim 11 including rigid insulating means filling said recess around said mounting post for securing said upstanding terminal element legs in symmetrical array around the axis of said mounting post, said terminal element legs having outer end portions projecting upwardly of said rigid insulating means adapted for electrical connection thereto.

14. The rectifier of claim 11 wherein said layer of insulating material comprises insulating varnish applied to said recess bottom wall in liquid form and subsequently cured into a thin layer of rigid insulating material bonded to said bottom wall for high heat conductance and high dielectric strength.

* * * * *